(12) United States Patent
Nyang

(10) Patent No.: US 9,740,797 B2
(45) Date of Patent: Aug. 22, 2017

(54) COUNTING BLOOM FILTER

(71) Applicant: INHA-INDUSTRY PARTNERSHIP INSTITUTE, Incheon (KR)

(72) Inventor: DaeHun Nyang, Seoul (KR)

(73) Assignee: Inha-Industry Partnership Institute, Incheon (KR)

( * ) Notice: Subject to any disclaimer, the term of this patent is extended or adjusted under 35 U.S.C. 154(b) by 0 days.

(21) Appl. No.: 15/021,133

(22) PCT Filed: Oct. 14, 2013

(86) PCT No.: PCT/KR2013/009167
§ 371 (c)(1),
(2) Date: Mar. 10, 2016

(87) PCT Pub. No.: WO2015/056818
PCT Pub. Date: Apr. 23, 2015

(65) Prior Publication Data
US 2016/0224685 A1  Aug. 4, 2016

(51) Int. Cl.
*G06F 17/30* (2006.01)
(52) U.S. Cl.
CPC .... *G06F 17/30949* (2013.01); *G06F 17/3033* (2013.01); *G06F 17/30097* (2013.01); *G06F 17/30867* (2013.01)
(58) Field of Classification Search
CPC ......... G06F 17/30867; G06F 17/30864; G06F 17/30321; G06F 17/30949; G06F 17/3033; G06F 17/30097
USPC ....................................... 707/722, 736, 741
See application file for complete search history.

(56) References Cited

U.S. PATENT DOCUMENTS

| 7,433,355 B2 | 10/2008 | Wilson et al. |
| 7,930,547 B2 | 4/2011 | Hao et al. |
| 2005/0086520 A1 | 4/2005 | Dharmapurikar et al. |
| 2008/0313132 A1* | 12/2008 | Hao ......................... H04L 45/00 |
| 2009/0319506 A1* | 12/2009 | Ngan ................... G06Q 10/107 |

(Continued)

FOREIGN PATENT DOCUMENTS

| KR | 1020130068051 A | 6/2013 |
| KR | 1020130088918 A | 8/2013 |

OTHER PUBLICATIONS

Bonomi, F., et al., "An Improved Construction for Counting Bloom Filters," Algorithms-ESA, Lecture Notes in Computer Science, pp. 684-695 (Sep. 2006).

(Continued)

*Primary Examiner* — Rehana Perveen
*Assistant Examiner* — Loc Tran
(74) *Attorney, Agent, or Firm* — Brundidge & Stanger, P.C.

(57) ABSTRACT

Technologies are generally described for a scheme for computing a counting number of a keyword. In some examples, a method performed under control of a computing device may include obtaining a result of a j-th set of hash functions with regard to a key; marking a head marker into a bit array of a bloom filter based at least in part on the result of the j-th set of hash functions, if the j is zero; and marking a tail marker into the bit array of the bloom filter based at least in part on the result of the j-th set of hash functions, if the j is the same as or larger than 1.

18 Claims, 7 Drawing Sheets

(56) References Cited

U.S. PATENT DOCUMENTS

2010/0269024 A1* 10/2010 Hao ................... H03M 13/51
714/777
2012/0223889 A1 9/2012 Medlock et al.

OTHER PUBLICATIONS

International Search Report and Written Opinion for International Application No. PCT/KR2013/009167, mailed on Jul. 31, 2014.
Pagh, A., et al., "An Optimal Bloom Filter Replacement," SODA '05 Proceedings of the sixteenth annual ACM-SIAM symposium on Discrete algorithms, pp. 823-829 (Jan. 23, 2005).
Yu, H., et al., A Memory-Efficient Hashing by Multi-Predicate Bloom Filters for Packet Classification, INFOCOM 2008. The 27th Conference on Computer Communications. IEEE, pp. 2467-2475 (Apr. 13-18, 2008).

* cited by examiner

[Fig. 1]
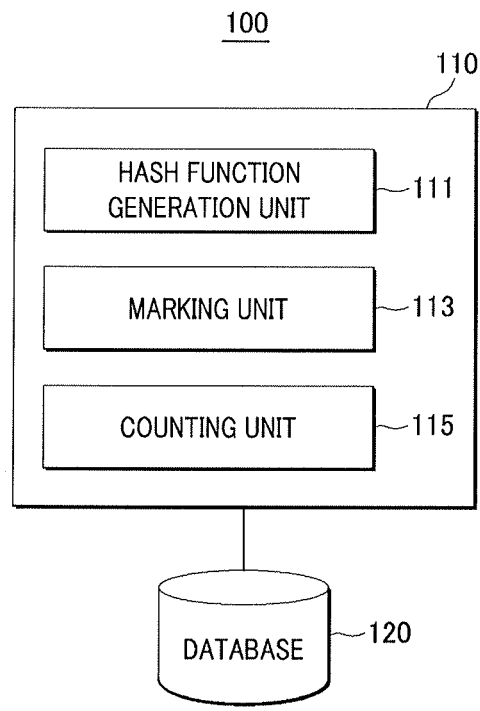
[Fig. 2]
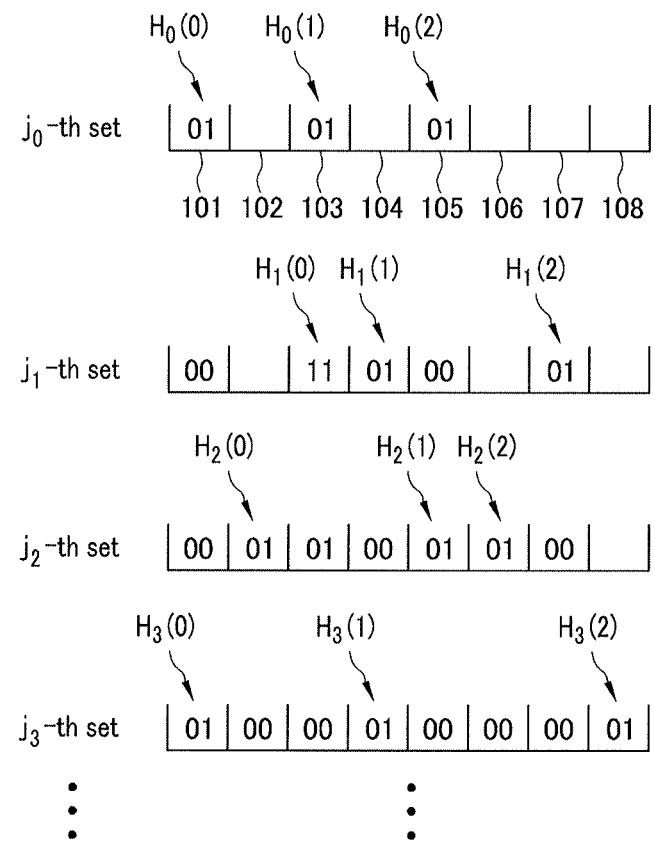

[Fig. 3]
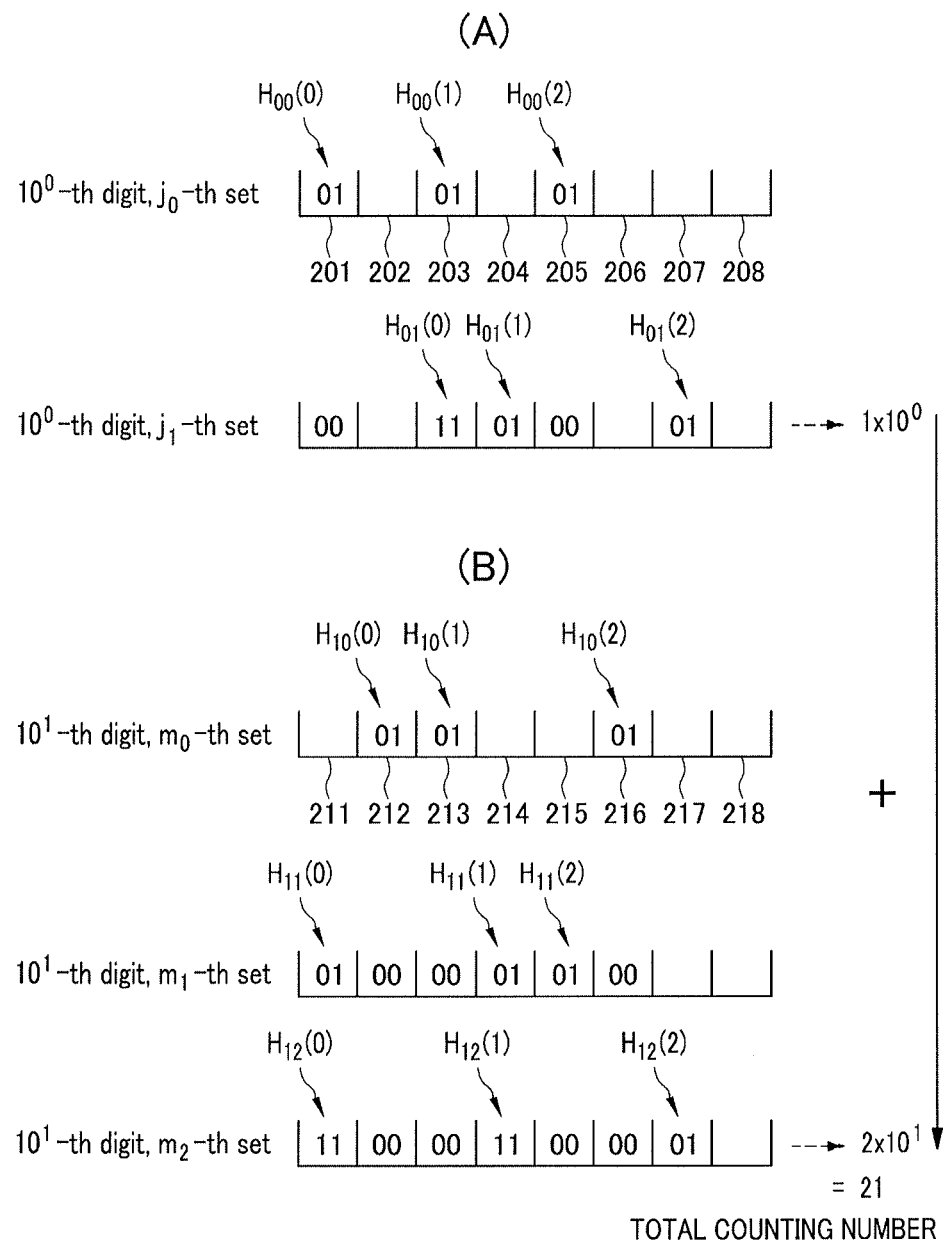

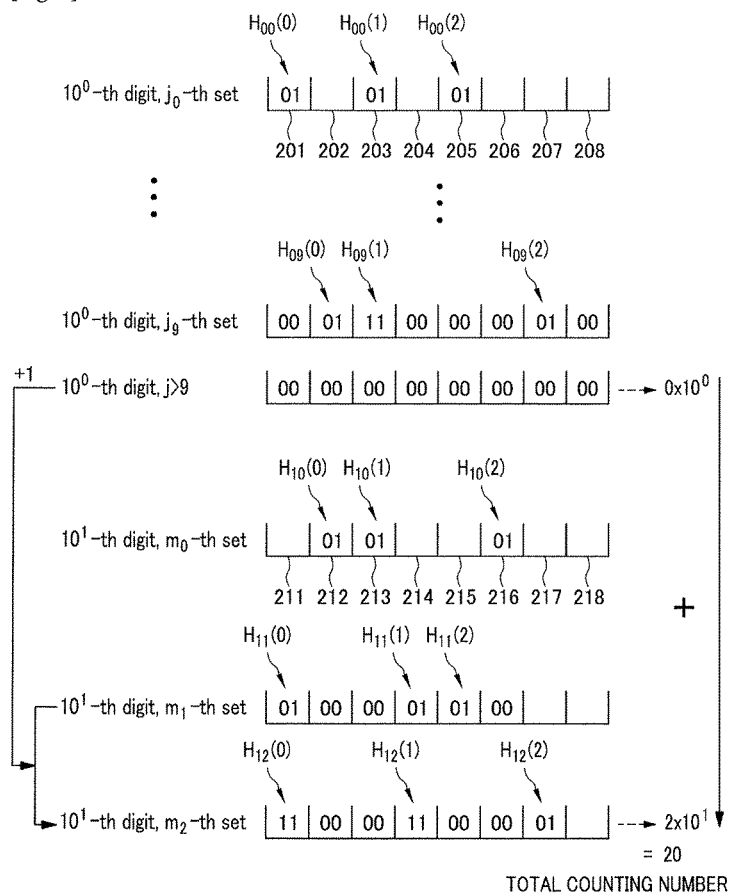

[Fig. 5]
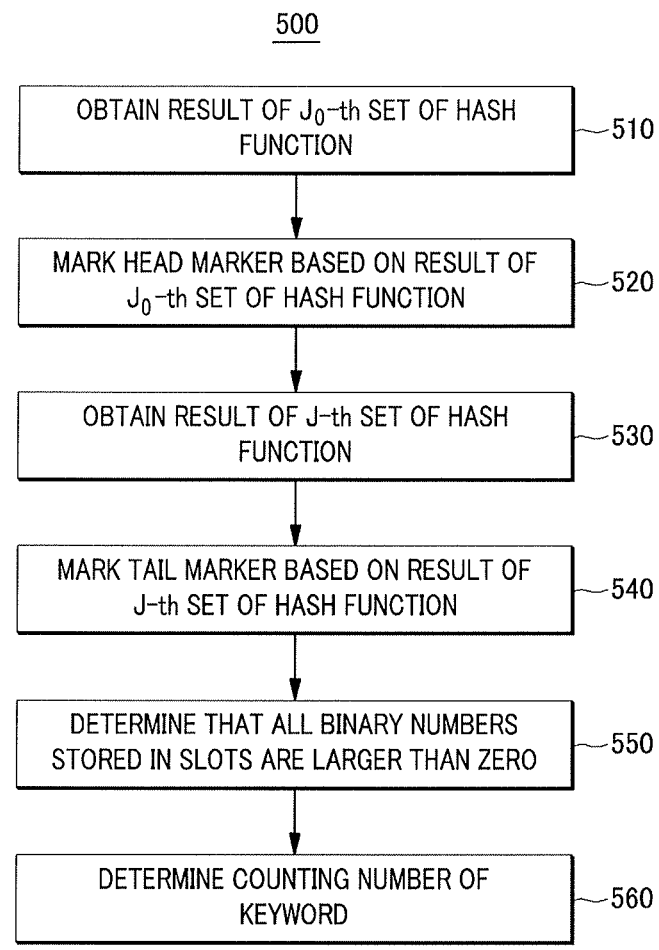

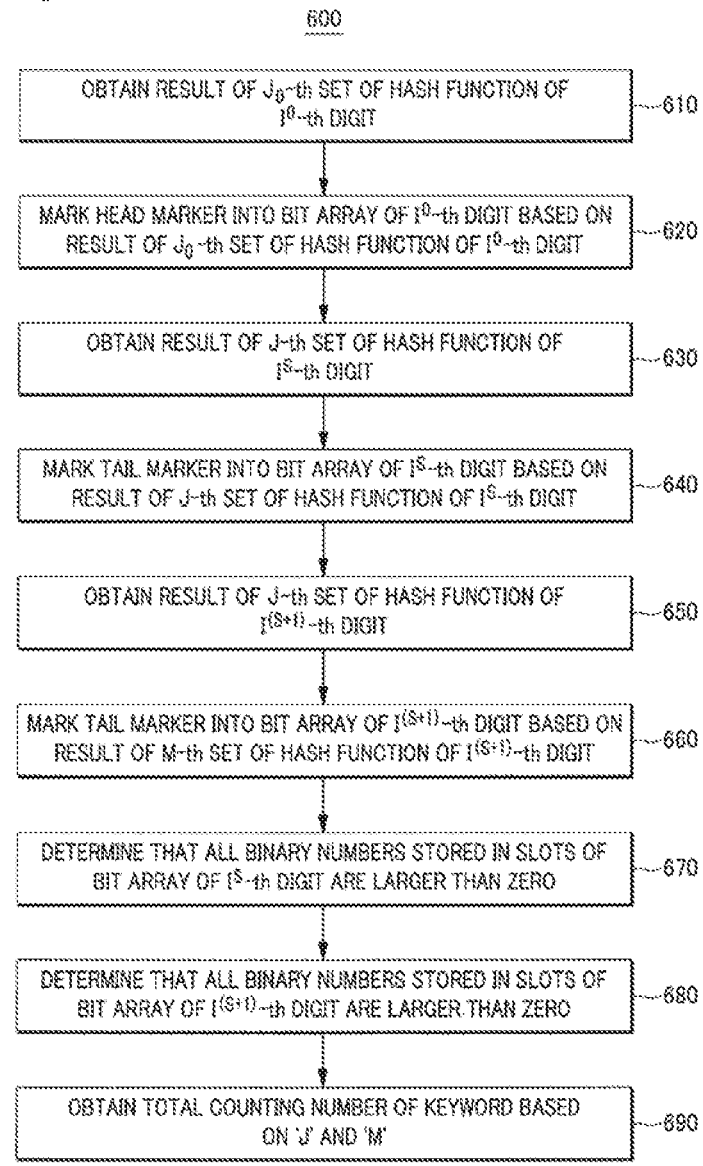

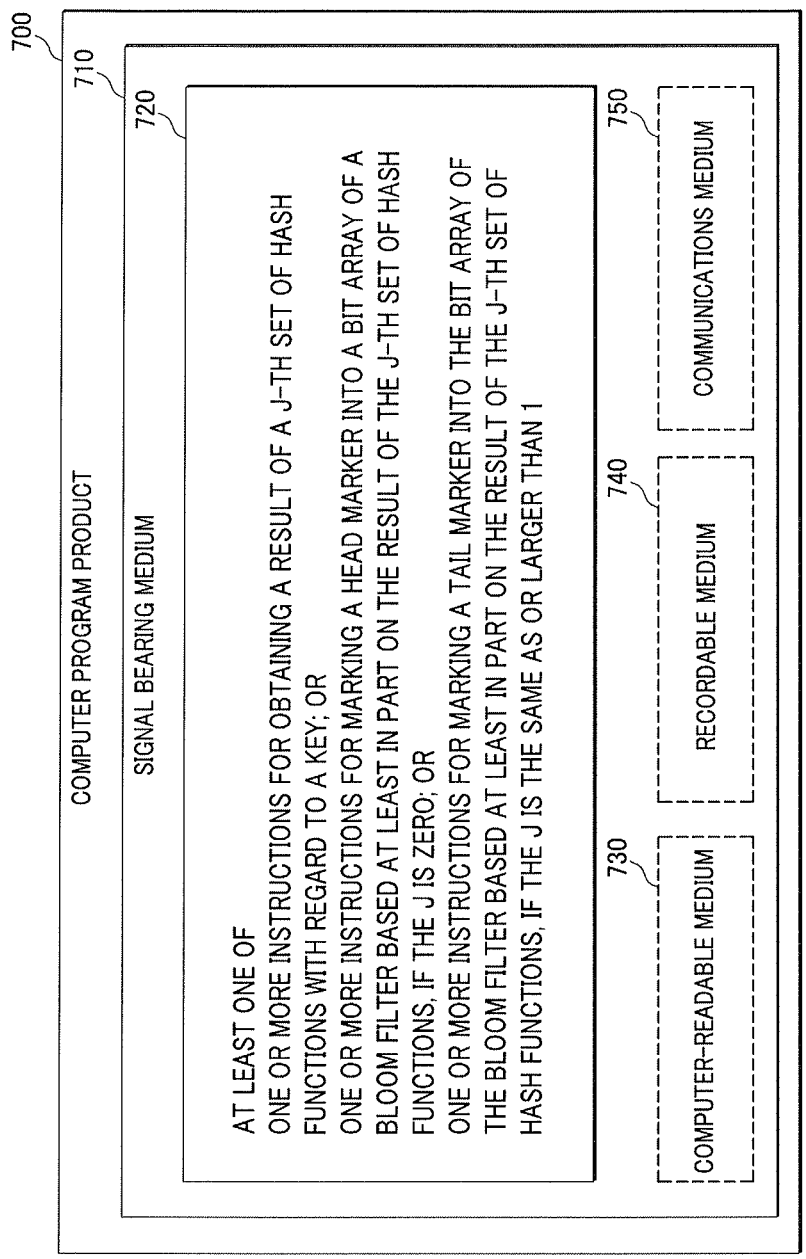

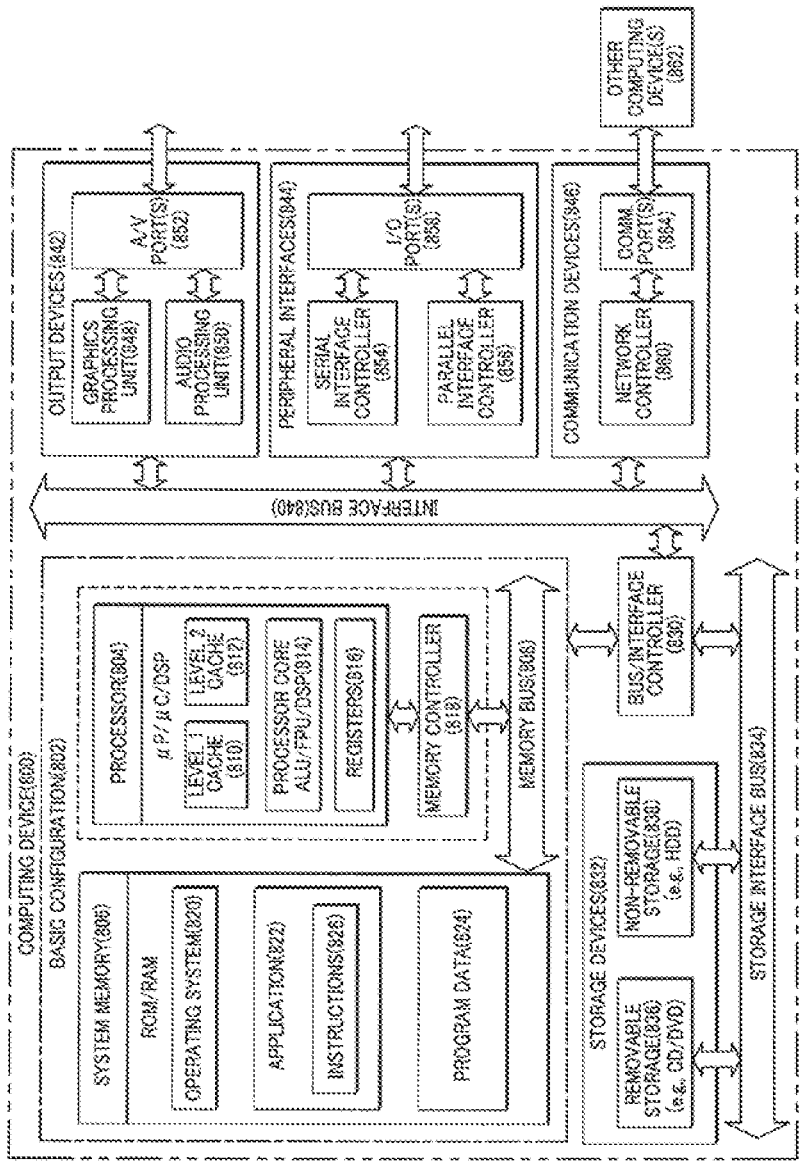
[Fig. 8]

COUNTING BLOOM FILTER

CROSS-REFERENCE TO RELATED APPLICATION

This Application is the U.S. National Stage filing under 35 U.S.C. §371 of PCT Application Ser. No. PCT/KR2013/009167 filed on Oct. 14, 2013.

BACKGROUND

A Bloom filter is a compact data structure used for probabilistic representation of a data set in order to support membership queries. Membership queries using a Bloom filter check if an element is a member of the data set. A Bloom filter has been used in database applications to store large amounts of static data and allow reduction in the time it takes to lookup data from a slow storage device to faster main memory. A Bloom filter is found to be particularly useful in data management for modeling, storing, indexing, and querying data and services hosted by numerous computing nodes.

SUMMARY

In an example, a method performed under control of a computing device may include obtaining a result of a j-th set of hash functions with regard to a key; marking a head marker into a bit array of a bloom filter based at least in part on the result of the j-th set of hash functions, if the j is zero; and marking a tail marker into the bit array of the bloom filter based at least in part on the result of the j-th set of hash functions, if the j is the same as or larger than 1.

In another example, a method performed under control of a computing device may include obtaining a result of a j-th set of hash functions of an $i^s$-th digit with regard to a key; marking a head marker into a bit array of the $i^s$-th digit of a bloom filter based at least in part on the result of the j-th set of hash functions of the $i^s$-th digit, if the j is zero; and marking a tail marker into the bit array of the $i^s$-th digit of the bloom filter based at least in part on the result of the j-th set of hash functions of the is $i^s$-th digit, if the j is the same as or larger than 1. The 'j' is an integer which is within a range of from zero to (i−1) and the 's' is an integer which is the same as or larger than zero.

In yet another example, a computer-readable storage medium may store thereon computer-executable instructions that, in response to execution, cause a computing device to perform operations including obtaining a result of a j-th set of hash functions with regard to a key; marking a head marker into a bit array of a bloom filter based at least in part on the result of the j-th set of hash functions, if the j is zero; and marking a tail marker into the bit array of the bloom filter based at least in part on the result of the j-th set of hash functions, if the j is the same as or larger than 1.

In yet another example, a computer-readable storage medium may store thereon computer-executable instructions that, in response to execution, cause a computing device to perform operations including obtaining a result of a j-th set of hash functions of an $i^s$-th digit with regard to a key; marking a head marker into a bit array of the $i^s$-th digit of a bloom filter based at least in part on the result of the j-th set of hash functions of the $i^s$-th digit, if the j is zero; and marking a tail marker into the bit array of the $i^s$-th digit of the bloom filter based at least in part on the result of the j-th set of hash functions of the $i^s$-th digit, if the j is the same as or larger than 1. The 'j' is an integer which is within a range of from zero to (i−1) and the 's' is an integer which is the same as or larger than zero.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. With the understanding that these drawings depict only several embodiments in accordance with the disclosure and are, therefore, not to be considered limiting of its scope, the disclosure will be described with additional specificity and detail through use of the accompanying drawings, in which:

FIG. 1 shows a schematic block diagram illustrating an example architecture for a computing system, arranged in accordance with at least some embodiments described herein;

FIG. 2 schematically shows an illustrative example of computing a counting number of a keyword, arranged in accordance with at least some embodiments described herein;

FIGS. 3A and 3B schematically show another illustrative example of computing a counting number of a keyword, arranged in accordance with at least some embodiments described herein;

FIG. 4 schematically shows still another illustrative example of computing a counting number of a keyword, arranged in accordance with at least some embodiments described herein;

FIG. 5 shows an example flow diagram of a process of a computing device for computing a counting number of a keyword, arranged in accordance with at least some embodiments described herein;

FIG. 6 shows another example flow diagram of a process of a computing device for computing a counting number of a keyword, arranged in accordance with at least some embodiments described herein;

FIG. 7 illustrates a computer program product that may be utilized to provide a scheme for computing a counting number of a keyword, arranged in accordance with at least some embodiments described herein; and FIG. 8 is a block diagram illustrating an example computing device that may be utilized to provide a scheme for computing a counting number of a keyword, arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to schemes for computing a counting number of a keyword. Technologies are generally described for a computing system that marks a head marker and a tail marker into at least one bit array of a counting bloom filter, whenever a keyword is registered into a database, and obtains a counting number of the keyword based on the marker and tail marker.

FIG. 1 shows a schematic block diagram illustrating an example architecture for a computing system, arranged in accordance with at least some embodiments described herein. As depicted in FIG. 1, a computing system 100 may include a computing device 110 and a database 120. Computing device 110 may be connected to database 120 via a network. By way of example, but not limitation, the network between computing device 110 and database 120 may include a wired network such as LAN (Local Area Network), WAN (Wide Area Network), VAN (Value Added Network) or the like, or all kinds of wireless network such as a mobile radio communication network, a satellite network, a Bluetooth, WiBro (Wireless Broadband Internet), Mobile WiMAX, HSDPA (High Speed Downlink Packet Access) or the like. Further, computing device 110 may include a hash function generation unit 111, a marking unit 113, and a counting unit 115. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of hash function generation unit 111, marking unit 113 and a counting unit 115 may be included in an instance of an application hosted on computing device 110.

Computing device 110 may refer to any type of a device, an apparatus, or a server that provides at least one service of registering a keyword in database 120 and retrieving a counting number of the keyword from database 120 by using a counting bloom filter. Further, database 120 may refer to any type of a device, an apparatus, or a server that provides a service of data storage. By way of example, but not limitation, at least one bit array of a counting bloom filter may be stored in database 120. Although, database 120 is depicted as a separate unit from computing device 110 in FIG. 1, it will be understood by those skilled in the art that some or all of the functions or operations of database 120 may be performed by a unit or a module included in computing device 110.

In some embodiments, hash function generation unit 111 may be configured to generate and prepare a j-th set of hash functions. By way of example, but not limitation, multiple hash functions are stored in a memory, which is operatively coupled to computing device 110, and hash function generation unit 111 may select and retrieve 'k' number of hash functions as the j-th set of hash functions. Further, the number of 'j' may be an integer which is the same as or larger than zero and the number of 'k' may be an integer which is larger than zero.

Hash function generation unit 111 may be further configured to obtain a result of the j-th set of hash functions with regard to a keyword. By way of example, hash function generation unit 111 may be configured to process the 'k' number of hash functions of the j-th set with regard to the keyword and then, obtain result values of the each 'k' number of hash functions. At least a part of the 'k' numbers of hash functions of the each j-th set may be different. For example, at least a part of the 'k' number of hash functions of the first set is different from the 'k' number of hash functions of the second set. Accordingly, the result values of the 'k' number of hash functions of the each j-th set may be different from each other.

In some other embodiments, hash function generation unit 111 may be configured to generate and prepare a j-th set of hash functions of an $i^s$-th digit. The number of 'j' may be an integer which is within a range of from zero to (i−1). Further, the j-th set of hash functions may include 'k' number of hash functions. The number of 'i' may be an integer which is larger than one and the number of 's' may be an integer which is the same as or larger than zero.

Further, hash function generation unit 111 may be configured to generate and prepare an m-th set of hash functions of an $i^{(s+1)}$-th digit. The number of 'm' may be an integer which is within a range of from zero to (i−1). Further, the m-th set of hash functions may include 'k' number of hash functions.

Hash function generation unit 111 may be further configured to obtain a result of the j-th set of hash functions of the $i^s$-th digit with regard to a keyword. By way of example, hash function generation unit 111 may be configured to process the 'k' number of hash functions of the j-th set with regard to the keyword and then, obtain result values of the each 'k' number of hash functions. Further, hash function generation unit 111 may be further configured to obtain a result of the m-th set of hash functions of the $i^{(s+1)}$-th digit with regard to the keyword. By way of example, hash function generation unit 111 may be configured to process the 'k' number of hash functions of the m-th set with regard to the keyword and then, obtain result values of the each 'm' number of hash functions.

In some embodiments, marking unit 113 may be configured to mark a head marker into a bit array of a counting bloom filter based at least in part on the result values of the j-th set of hash functions, if the number of 'j' is zero. The term "marking a head marker" may refer to recording at least one f-bit binary number into the bit array of the counting bloom filter when the number of 'j' is zero so as to indicate that the keyword has been registered in database 120.

Further, marking unit 113 may be configured to mark a tail marker into the bit array of the counting bloom filter based at least in part on the result values of the j-th set of hash functions, if the number of 'j' is the same as or larger than one. The term "marking a tail marker" may refer to recording at least one f-bit binary number into the bit array of the counting bloom filter when the number of 'j' is the same as or larger than one so as to indicate that how many times the keyword is registered in database 120.

By way of example, but not limitation, the bit array of the counting bloom filter may be stored in database 120 and may include 'd' number of slots. An f-bit binary number may be recorded in each of the 'd' number of slots. Non-limiting examples of the number of 'f' may be two, eight, sixteen, etc. The result values of the each 'k' number of hash functions may correspond to one of from one to the number of 'd'. Accordingly, f-bit binary numbers may be recorded in 'k' number of slots from among the 'd' number of slots, to which the result values of the each 'k' number of hash functions corresponds.

In some other embodiments, marking unit 113 may be configured to mark a head marker into a bit array of the $i^s$-th digit of a counting bloom filter based at least in part on the result values of the j-th set of hash functions of the $i^s$-th digit, if the number of 'j' is zero.

Further, marking unit 113 may be configured to mark a tail marker into the bit array of the $i^s$-th digit of the counting bloom filter based at least in part on the result values of the j-th set of hash functions of the $i^s$-th digit, if the number of 'j' is the same as or larger than one. The term "marking a tail marker into the bit array of the $i^s$-th digit" may refer to recording at least one f-bit binary number into the bit array of the $i^s$-th digit of the counting bloom filter when the number of 'j' is the same as or larger than one so as to indicate the number of $i^s$-th digit of a total counting number that the keyword is registered in database 120.

Further, marking unit 113 may be configured to mark a tail marker into the bit array of the $i^{(s+1)}$-th digit of the counting bloom filter based at least in part on the result values of the m-th set of hash functions. The term "marking a tail marker into the bit array of the $i^{(s+1)}$-th digit" may refer to recording at least one f-bit binary number into the bit array of the $i^{(s+1)}$-th digit of the counting bloom filter so as to indicate the number of $i^{(s+1)}$-th digit of the total counting number that the keyword is registered in database 120.

By way of example, but not limitation, the bit array of the $i^s$-th digit of the counting bloom filter may be stored in database 120 and may include 'd' number of slots. An f-bit binary number may be recorded in each of the 'd' number of slots. The f-bit binary number may be within a range of zero to (i−1). Non-limiting examples of the number of 'f' may be two, eight, sixteen, etc. The result values of the each 'k' number of hash functions of the each j-th set of hash functions may correspond to one of from one to the number of 'd'. Accordingly, f-bit binary numbers may be recorded in 'k' number of slots from among the 'd' number of slots, to which the result values of the each 'k' number of hash functions corresponds.

Further, the bit array of the $i^{(s+1)}$-th digit of the counting bloom filter may be stored in database 120 and may include 'e' number of slots. In some embodiments, the number of 'e' may be the same as or smaller than the number of 'd'. An f-bit binary number may be recorded in each of the 'e' number of slots. The f-bit binary number may be within a range of zero to (i−1). The result values of the each 'k' number of hash functions of the each m-th set of hash functions may correspond to one of from one to the number of 'e'. Accordingly, f-bit binary numbers may be recorded in 'k' number of slots from among the 'e' number of slots, to which the result values of the each 'k' number of hash functions corresponds. The number of 'k' may be smaller than the number of 'd' and 'e'.

In some embodiments, counting unit 115 may be configured to determine that all of the f-bit binary numbers stored in the 'k' number of slots are larger than zero. By way of example, but not limitation, counting unit 115 may calculate and process from first set of hash functions to j-th set of hash functions with regard to the keyword and then, may determine the j-th set of hash functions in order to determine a counting number of the keyword. Since the result values of 'k' number of hash functions of the determined j-th set of hash functions correspond to 'k' number of slots, an f-bit binary number which is larger than zero may be stored in each of the 'k' number of slots. Accordingly, counting unit 115 may determine the number of 'j' as the counting number of the keyword.

In some other embodiments, counting unit 115 may be configured to determine that a counting number of $i^s$-th digit of a total counting number that the keyword is registered in database 120 is the number of based on the f-bit binary numbers stored in the 'k' number of slots of the bit array of the $i^s$-th digit. By way of example, but not limitation, counting unit 115 may calculate and process from first set of hash functions to j-th set of hash functions of the $i^s$-th digit with regard to the keyword and then, may determine the j-th set of hash functions in order to determine a counting number of the $i^s$-th digit of the total counting number. Since the result values of 'k' number of hash functions of the j-th set of the $i^s$-th digit correspond to 'k' number of slots, an f-bit binary number which is larger than zero may be stored in each of the 'k' number of slots. Accordingly, counting unit 115 may determine the number of 'j' as a counting number of the $i^s$-th digit of the total counting number.

Further, counting unit 115 may be configured to determine that a counting number of $i^{(s+1)}$-th digit of the total counting number is the number of 'm' based on the f-bit binary numbers stored in the 'k' number of slots of the bit array of the $i^{(s+1)}$-th digit. By way of example, but not limitation, counting unit 115 may calculate and process from first set of hash functions to m-th set of hash functions of the $i^{(s+1)}$-th digit with regard to the keyword and then, may determine the m-th set of hash functions in order to determine a counting number of the $i^{(s+1)}$-th digit of the total counting number. Since the result values of 'k' number of hash functions of the m-th set of the $i^{(s+1)}$-th digit correspond to 'k' number of slots, an f-bit binary number which is larger than zero may be stored in each of the 'k' number of slots. Accordingly, counting unit 115 may determine the number of 'm' as a counting number of the $i^{(s+1)}$-th digit of the total counting number.

Further, counting unit 115 may be configured to obtain the total counting number based on the determined numbers of 'j' and 'm'. By way of example, but not limitation, counting unit 115 may be configured to multiply the number of 'j' by the number of '$i^s$' and multiply the number of 'm' by the number of '$i^{(s+1)}$'. Then, counting unit 115 may be further configured to sum the result of multiplication of 'j' and '$i^s$' and the result of multiplication of 'm' and '$i^{(s+1)}$'. So, counting unit 115 may be configured to determine the total counting number as the result of the sum.

FIG. 2 schematically shows an illustrative example of computing a counting number of a keyword, arranged in accordance with at least some embodiments described herein. In some embodiments, computing device 110 may be configured to obtain a result of a j-th set of hash functions with regard to a keyword. The number of 'j' may be an integer which is the same as or larger than zero. Further, each j-th set of hash functions may include 'k' number of hash functions. By way of example, in FIG. 2, each j-th set of hash functions may include three hash functions.

Further, computing device 110 may be configured to mark a head marker into a bit array of a counting bloom filter based at least in part on the result values of the j-th set of hash functions, if the number of 'j' is zero. The bit array of the counting bloom filter may include 'd' number of slots. An f-bit binary number may be recorded in each of the 'd' number of slots. Non-limiting examples of the number of 'f' may be two, eight, sixteen, etc. By way of example, but not limitation, in FIG. 2, the bit array of the counting bloom filter may include eight slots 101, 102, 103, 104, 105, 106, 107, and 108, and a two-bit binary number is recorded in each of eight slots 101, 102, 103, 104, 105, 106, 107, and 108.

The result values of the 'k' number of hash functions of the j-th set of hash function may corresponds to a value of from one to the number of 'd'. By way of example, but not limitation, as depicted in FIG. 2, the result values of the three hash functions of the $j_0$-th set of hash functions correspond to one, three, and five, respectively. Accordingly, as the head marker, computing device 110 may be configured to set one of the two-bit binary number into first slot 101, third slot 103, and fifth slot 105. In FIG. 2, '$H_0(0)$' may refer to a first hash function of the $j_0$-th set, '$H_0(1)$' may refer to a second hash function of the $j_0$-th set, and, '$H_0(2)$' may refer to a third hash function of the $j_0$-th set.

Further, computing device 110 may be configured to mark a tail marker into the bit array of the counting bloom filter based at least in part on the result values of the j-th set of hash function, if the number of 'j' is the same as or larger than one. By way of example, but not limitation, as depicted in FIG. 2, the result values of the three hash functions of the $j_1$-th set of hash functions correspond to three, four, and seven, respectively. Accordingly, as the tail marker, computing device 110 may be configured to increase the two-bit binary numbers stored in third slot 103, fourth slot 104, and seventh slot 107 by one. Further, computing device 110 may be configured to decrease the two-bit binary numbers stored in first slot 101 and fifth slot 105 by one, to which the result values of the three hash functions of the j0-th set of hash functions correspond but the result values of the three hash functions of the $j_1$-th set of hash functions do not correspond. In FIG. 2, 'H1(0)' may refer to a first hash function of the $j_1$-th set, 'H1(1)' may refer to a second hash function of the $j_1$-th set, and, 'H1(2)' may refer to a third hash function of the $j_1$-th set.

Further, when the keyword is registered in database 120 more by one time, computing device 110 may be configured to re-mark the tail marker into the bit array of the counting bloom filter based at least in part on the result values of the $j_2$-th set of hash function. By way of example, but not limitation, as depicted in FIG. 2, the result values of the three hash functions of the $j_2$-th set of hash functions correspond to two, five, and six, respectively. Accordingly, as the tail marker, computing device 110 may be configured to increase the two-bit binary numbers stored in second slot 102, fifth slot 105, and sixth slot 106 by one. In some embodiments, computing device 110 may be configured to decrease the two-bit binary numbers stored in third slot 103, fourth slot 104 and seventh slot 107 by one, to which the result values of the three hash functions of the $j_1$-th set of hash function correspond but the result values of the three hash functions of the $j_2$-th set of hash function do not correspond. Then, computing device 110 may be further configured to re-mark the tail marker into the bit array by increasing the two-bit binary numbers stored in second slot 102, fifth slot 105, and sixth slot 106 by one. In FIG. 2, '$H_2(0)$' may refer to a first hash function of the $j_2$-th set, '$H_2(1)$' may refer to a second hash function of the $j_2$-th set, and, '$H_2(2)$' may refer to a third hash function of the $j_2$-th set.

Further, when the keyword is registered in database 120 more by one time, computing device 110 may be configured to re-mark the tail marker into the bit array of the counting bloom filter based at least in part on the result values of the $j_3$-th set of hash functions. By way of example, but not limitation, as depicted in FIG. 2, the result values of the three hash functions of the $j_3$-th set of hash function correspond to one, four, and eight, respectively. Accordingly, as the tail marker, computing device 110 may be configured to decrease the two-bit binary numbers stored in other slots (e.g., second slot 102, third slot 103, fifth slot 105 and sixth slot 106) by one, to which the result values of the three hash functions of the $j_3$-th set of hash function do not correspond. Then, computing device 110 may be further configured to re-mark the tail marker into the bit array by increasing the two-bit binary numbers stored in first slot 101, fourth slot 104, and eighth slot 108 by one. In FIG. 2, '$H_3(0)$' may refer to a first hash function of the $j_3$-th set, '$H_3(1)$' may refer to a second hash function of the $j_3$-th set, and, '$H_3(2)$' may refer to a third hash function of the $j_3$-th set.

Further, computing device 110 may be configured to detect the number of 'j' by determine that all of the f-bit binary numbers stored in the 'k' slots, to which the result values of the 'k' hash functions of the j-th set of hash function correspond, are larger than zero. By way of example, but not limitation, computing device 110 may be configured to calculate and process from first set of hash functions to j-th set of hash functions with regard to the keyword. Then, computing device 110 may be configured to determine the number of when all of the f-bit binary numbers stored in the 'k' slots, to which the result values of the 'k' hash functions of the j-th set of hash function correspond, are larger than zero. Computing device 110 may be further configured to determine that a counting number of the keyword is the number of 'j'.

FIGS. 3A and 3B schematically show another illustrative example of computing a counting number of a keyword, arranged in accordance with at least some embodiments described herein. FIG. 3A depicts a bit array of an $i^s$-th digit of a counting bloom filter. The bit array of the $i^s$-th digit of the counting bloom filter may include 'd' number of slots. Further, the number of 'i' may be an integer which is larger than one and the number of 's' may be an integer which is the same as or larger than zero. An f-bit binary number may be recorded in each of the 'd' number of slots. Non-limiting examples of the number of 'f' may be two, eight, sixteen, etc. By way of example, but not limitation, in FIG. 3A, the bit array of the is-th digit of the counting bloom filter may include eight slots 201, 202, 203, 204, 205, 206, 207 and 208, and a two-bit binary number is recorded in each of eight slots 201, 202, 203, 204, 205, 206, 207 and 208. Further, FIG. 3B depicts a bit array of an $i^{(s+1)}$-th digit of the counting bloom filter. The bit array of the $i^{(s+1)}$-th digit of the counting bloom filter may include 'e' number of slots. An f-bit binary number may be recorded in each of the 'e' number of slots. By way of example, but not limitation, in FIG. 3B, the bit array of the $i^{(s+1)}$-th digit of the counting bloom filter may include eight slots 211, 212, 213, 214, 215, 216, 217 and 218, and a two-bit binary number is recorded in each of eight slots 211, 212, 213, 214, 215, 216, 217 and 218.

In some embodiments, computing device 110 may be configured to obtain a result of a j-th set of hash functions of the $i^s$-th digit with regard to a keyword. The number of 'j' may be an integer which is within a range of from zero to (i−1). Further, each j-th set of hash functions may include 'k' number of hash functions. By way of example, in FIG. 3A, each j-th set of hash functions may include three hash functions.

Further, computing device 110 may be configured to mark a head marker into the bit array of the $i^s$-th digit of the counting bloom filter based at least in part on the result values of the j-th set of hash functions of the $i^s$-th digit, if the number of 'j' and 's' are zero.

The result values of the 'k' number of hash functions of the j-th set of hash functions of the $i^s$-th digit may correspond to a value of from one to the number of 'd'. By way of example, but not limitation, as depicted in FIG. 3A, the result values of the three hash functions of the $j_0$-th set of hash functions of the $10^0$-th digit correspond to one, three, and five, respectively. Accordingly, as the head marker, computing device 110 may be configured to set one of the two-bit binary number into first slot 201, third slot 203, and fifth slot 205. In FIG. 3A, '$H_{00}(0)$' may refer to a first hash function of the $j_0$-th set of the $i^s$-th digit, '$H_{00}(1)$' may refer to a second hash function of the $j_0$-th set of the $i^s$-th digit, and, '$H_{00}(2)$' may refer to a third hash function of the $j_0$-th set of the $i^s$-th digit.

Further, computing device 110 may be configured to mark a tail marker into the bit array of the $i^s$-th digit of the counting bloom filter based at least in part on the result values of the j-th set of hash functions of the $i^s$-th digit, if the number of 'j' is the same as or larger than one. By way of example, but not limitation, as depicted in FIG. 3A, the result values of the three hash functions of the $j_1$-th set of hash functions of the $10^0$-th digit correspond to three, four, and seven, respectively. Accordingly, as the tail marker, computing device 110 may be configured to increase the two-bit binary numbers stored in third slot 203, fourth slot 204, and seventh slot 207 by one. Further, computing device 110 may be configured to decrease the two-bit binary numbers stored in first slot 201 and fifth slot 205, to which the result values of the hash functions of the $j_1$-th set of hash function of the $10^0$-th digit do not correspond. In FIG. 3A, '$H_{01}(0)$' may refer to a first hash function of the $j_1$-th set of the $i^s$-th digit, '$H_{01}(1)$' may refer to a second hash function of the $j_1$-th set of the $i^s$-th digit, and, '$H_{01}(2)$' may refer to a third hash function of the $j_1$-th set of the $i^s$-th digit.

In some embodiments, computing device 110 may be configured to obtain a result of an m-th set of hash functions of the $i^{(s+1)}$-th digit with regard to the keyword. The number of 'm' may be an integer which is within a range of from zero to (i−1). Further, each m-th set of hash functions may include 'k' number of hash functions. By way of example, in FIG. 3B, each m-th set of hash functions may include three hash functions.

Further, computing device 110 may be configured to mark a tail marker into the bit array of the $i^{(s+1)}$-th digit of the counting bloom filter based at least in part on the result values of the m-th set of hash functions of the $i^{(s+1)}$-th digit. The result values of the 'k' number of hash functions of the m-th set of hash functions of the $i^{(s+1)}$-th digit may correspond to a value of from one to the number of 'e'.

By way of example, but not limitation, as depicted in FIG. 3B, the result values of the three hash functions of the $m_0$-th set of hash function of the $10^1$-th digit correspond to two, three, and six, respectively. Accordingly, as the tail marker, computing device 110 may be configured to increase the two-bit binary numbers stored in second slot 212, third slot 213, and sixth slot 216 by one. In FIG. 3B, '$H_{10}(0)$' may refer to a first hash function of the $m_0$-th set of the $i^{(s+1)}$-th digit, '$H_{10}(1)$' may refer to a second hash function of the $m_0$-th set of the $i^{(s+1)}$-th digit, and, '$H_{10}(2)$' may refer to a third hash function of the $m_0$-th set of the $i^{(s+1)}$-th digit.

Further, as depicted in FIG. 3B, when the keyword is registered in database 120 more by '$i^{(s+1)}$' time, computing device 110 may be configured to re-mark the tail marker into the bit array of the counting bloom filter based at least in part on the result values of the $m_1$-th set of hash functions. By way of example, but not limitation, the result values of the three hash functions of the $m^1$-th set of hash functions of the $10^1$-th digit correspond to one, four, and five, respectively. Accordingly, as the tail marker, computing device 110 may be configured to increase the two-bit binary numbers stored in first slot 211, fourth slot 214, and fifth slot 215 by one. Further, computing device 110 may be configured to decrease the two-bit binary numbers stored in second slot 212, third slot 213 and sixth slot 216 by one, to which the result values of the $m_0$-th set of hash functions of the $10^1$-th digit do not correspond. In FIG. 3B, '$H_{11}(0)$' may refer to a first hash function of the $m_1$-th set of the $i^{(s+1)}$-th digit, '$H_{11}(1)$' may refer to a second hash function of the $m_1$-th set of the $i^{(s+1)}$-th digit, and, '$H_{11}(2)$' may refer to a third hash function of the $m_1$-th set of the $i^{(s+1)}$-th digit.

Further, as depicted in FIG. 3B, when the keyword is registered in database 120 more by '$i^{(s+1)}$' time, computing device 110 may be configured to re-mark the tail marker into the bit array of the counting bloom filter based at least in part on the result values of the $m_2$-th set of hash functions. By way of example, but not limitation, the result values of the three hash functions of the $m_2$-th set of hash function of the $10^1$-th digit correspond to one, four, and seven, respectively. Accordingly, as the tail marker, computing device 110 may be configured to increase the two-bit binary numbers stored in first slot 211, fourth slot 214, and seventh slot 217 by one. Further, computing device 110 may be configured to decrease the two-bit binary numbers stored in fifth slot 215 by one, to which the result value of the hash functions of the $m_1$-th set of hash function of the $10^1$-th digit does not correspond. In FIG. 3B, '$H_{12}(0)$' may refer to a first hash function of the $m_2$-th set of the $i^{(s+1)}$-th digit, '$H_{12}(1)$' may refer to a second hash function of the $m_2$-th set of the $i^{(s+1)}$-th digit, and, '$H_{12}(2)$' may refer to a third hash function of the $m_2$-th set of the $i^{(s+1)}$-th digit.

Further, computing device 110 may be configured to determine that a counting number of $i^s$-th digit of a total counting number that the keyword is registered in database 120 is the number of 'j' based on the f-bit binary numbers stored in the number of slots of the bit array of $i^s$-th digit. By way of example, but not limitation, computing device 110 may be configured to calculate and process from first set of hash functions to j-th set of hash functions of the $i^s$-th digit with regard to the keyword and then, may select the j-th set of hash functions. Since the result values of 'k' number of hash functions of the selected j-th set of the $i^s$-th digit correspond to 'k' number of slots, an f-bit binary number which is larger than zero may be stored in each of the 'k' number of slots. Accordingly, computing device 110 may determine the number of 'j' as a counting number of the $i^s$-th digit of the total counting number. By way of example, in FIG. 3A, since all of the result values of the three hash functions of the $j_1$-th set of hash functions of the $i^s$-th digit are larger than zero, computing device 110 may determine the number of '1' as a counting number of the $i^s$-th digit of the total counting number.

Further, computing device 110 may be configured to determine that a counting number of $i^{(s+1)}$-th digit of the total counting number is the number of 'm' based on the f-bit binary numbers stored in the 'k' number of slots of the bit array of the $i^{(s+1)}$-th digit. By way of example, but not limitation, computing device 110 may be configured to calculate and process from $m_0$-th set of hash functions to m-th set of hash functions of the $i^{(s+1)}$-th digit with regard to the keyword and then, may select the m-th set of hash functions. Since the result values of 'k' number of hash functions of the selected m-th set of hash functions of the $i^{(s+1)}$-th digit correspond to 'k' number of slots, an f-bit binary number which is larger than zero may be stored in each of the 'k' number of slots. Accordingly, computing device 110 may determine the number of 'm' as a counting number of the $i^{(s+1)}$-th digit of the total counting number. By way of example, in FIG. 3B, since all of the result values of the three hash functions of the $m_2$-th set of hash function of the $i^{(s+1)}$-th digit are larger than zero, computing device 110 may determine the number of '2' as a counting number of the $i^{(s+1)}$-th digit of the total counting number.

Further, computing device 110 may be configured to obtain the total counting number based on the determined numbers of 'j' and 'm'. By way of example, but not limitation, computing device 110 may be configured to multiply the number of 'j' by the number of '$i^s$' and multiply the number of 'm' by the number of '$i^{(s+1)}$'. Then, computing device 110 may be further configured to sum the result of multiplication of 'j' and '$i^s$' and the result of multiplication of 'm' and '$i^{(s+1)}$'. So, computing device 110 may be configured to determine the total counting number as the result of the sum. By way of example, in FIGS. 3A and 3B, if the number of 'i' is '10' and 's' is '0', computing device 110 may be configured to multiply '1' by '$10^0$' and multiply '2' by '$10^1$'. Then, computing device 110 may be further configured to sum '1' and '20' and determine the total counting number of the keyword as '21'.

FIG. 4 schematically shows still another illustrative example of computing a counting number of a keyword, arranged in accordance with at least some embodiments described herein. In some embodiments, computing device 110 may be configured to obtain a result of a j-th set of hash functions of an $i^s$-th digit with regard to a keyword. Further, computing device 110 may be configured to mark a head marker into a bit array of the $i^s$-th digit of a counting bloom filter based at least in part on the result values of the j-th set of hash functions of the $i^s$-th digit, if the number of 'j' and 's' are zero. By way of example, but not limitation, as depicted in FIG. 4, the result values of three hash functions of the $j_0$-th set of hash functions of the $10^0$-th digit correspond to one, three, and five, respectively. Accordingly, as the head marker, computing device 110 may be configured to set one of the two-bit binary number into first slot 201, third slot 203, and fifth slot 205.

Further, computing device 110 may be configured to mark a tail marker into the bit array of the $i^s$-th digit of the counting bloom filter based at least in part on the result values of the j-th set of hash function of the $i^s$-th digit. By way of example, but not limitation, when the keyword is registered in database 120 more by the nine times of '$i^s_1$-th set of hash functions correspond, to a ninth slot set, to which the result values of $j_9$-th set of hash functions correspond. By way of example, computing device 110 may be configured to re-mark the tail marker into the bit array of the counting bloom filter based at least in part on the result value of the $j_9$-th set of hash functions. As depicted in FIG. 4, the result values of the three hash functions of $j_9$-th set of hash functions of the $i^s$-th digit correspond to two, three, and seven, respectively. Accordingly, as the tail marker, computing device 110 may be configured to increase the two-bit binary numbers stored in second slot 202, third slot 203, and seventh slot 207 by one.

If the number of 'j' becomes to be larger than (i−1), computing device 110 may be configured to set zero into the 'd' slots of the bit array of the $i^s$-th digit of the counting bloom filter. Then, computing device 110 may be configured to determine that a counting number of $i^s$-th digit of the total counting number is zero. By way of example, but not limitation, in FIG. 4, if the number of 'i' is '10' and 'j' becomes to be larger than '9', computing device 110 may be configured to set zero into the eight slots of the bit array of the $i^s$-th digit of the counting bloom filter.

Further, computing device 110 may be configured to mark a tail marker into the bit array of the $i^{(s+1)}$-th digit of the counting bloom filter based at least in part on the result values of the m-th set of hash functions of the $i^{(s+1)}$-th digit. By way of example, but not limitation, as depicted in FIG. 4, the result values of the three hash functions of $m_0$-th set of hash functions of the $i^{(s+1)}$-th digit correspond to two, three, and six, respectively. Accordingly, as the tail marker, computing device 110 may be configured to increase the two-bit binary numbers stored in second slot 212, third slot 213, and sixth slot 216 by one. Next, when the keyword is registered in database 120 more by '$i^{(s+1)}$' time, computing device 110 may be configured to re-mark the tail marker into the bit array of the $i^{(s+1)}$-th digit of the counting bloom filter based at least in part on the result values of the (m+1)-th set of hash functions of the $i^{(s+1)}$-th digit. By way of example, but not limitation, as depicted in FIG. 4, the result values of the three hash functions of $m_1$-th set of hash functions of the $i^{(s+1)}$-th digit correspond to one, four, and five, respectively. Accordingly, as the tail marker, computing device 110 may be configured to increase the two-bit binary numbers stored in first slot 211, fourth slot 214, and fifth slot 215 by one and decrease the two-bit binary numbers stored in second slot 212, third slot 213, and sixth slot 216 by one.

If the number of 'j' of the j-th set of hash functions of the $i^s$-th digit becomes to be larger than (i−1), computing device 110 may be configured to re-mark the tail marker into the bit array of the $i^{(s+1)}$-th digit of the counting bloom filter based at least in part on the result value of the (m+2)-th set of hash functions of the $i^{(s+1)}$-th digit. By way of example, but not limitation, as depicted in FIG. 4, the result values of the three hash functions of $m_2$-th set of hash function of the $i^{(s+1)}$-th digit correspond to one, four, and seven, respectively. Accordingly, as the tail marker, computing device 110 may be configured to increase the two-bit binary numbers stored in first slot 211, fourth slot 214, and seventh slot 217 by one and decrease the two-bit binary number stored in fifth slot 215 by one when the number of 'j' of the j-th set of hash functions of the $i^s$-th digit becomes to be larger than (i−1).

Further, computing device 110 may be configured to determine that a counting number of $i^{(s+1)}$-th digit of the total counting number is the number of 'm' based on the f-bit binary numbers stored in the 'k' number of slots of the bit array of $i^{(s+1)}$-th digit. By way of example, but not limitation, in FIG. 4, since all of the result values of the three hash functions of the $m_2$-th set of hash function of the $i^{(s+1)}$-th digit are larger than zero, computing device 110 may determine the number of '2' as a counting number of the $i^{(s+1)}$-th digit of the total counting number.

Further, computing device 110 may be configured to obtain the total counting number based on the determined numbers of 'j' and 'm'. By way of example, but not limitation, in FIG. 4, computing device 110 may be configured to multiply '0' by '$10^0$' and multiply '2' by '$10^1$'. Then, computing device 110 may be further configured to sum '0' and '20', and determine the total counting number of the keyword as '20'.

FIG. 5 shows an example flow diagram of a process 500 of a computing device for computing a counting number of a keyword, arranged in accordance with at least some embodiments described herein. The method in FIG. 5 may be implemented by computing device 110 illustrated in FIG. 1. An example process may include one or more operations, actions, or functions as illustrated by one or more blocks 510, 520, 530, 540, 550 and/or 560. Although illustrated as discrete blocks, various blocks may be divided into additional blocks, combined into fewer blocks, or eliminated, depending on the desired implementation. Processing may begin at block 510.

At block 510 (Obtain Result of $J_0$-th Set of Hash Function), computing device 110 may obtain a result of a j-th set of hash functions with regard to a keyword, when the number of 'j' is zero. The $j_0$-th set of hash functions may include 'k' number of hash functions. By way of example, computing device 110 may process the 'k' number of hash functions of the $j_0$-th set with regard to the keyword and obtain result values of the each 'k' number of hash functions. Processing may proceed from block 510 to block 520.

At block 520 (Mark Head Marker Based On Result of $J_0$-th Set of Hash Function), computing device 110 may mark a head marker into a bit array of a counting bloom filter based at least in part on the result values of the $j_0$-th set of hash function, which are obtained at block 510. The bit array of the counting bloom filter may include 'd' number of slots. An f-bit binary number may be recorded in each of the 'd' number of slots. Non-limiting examples of the number of 'f' may be two, eight, sixteen, etc. The result values of the 'k' number of hash functions of the $j_0$-th set, which are obtained at block 510, may corresponds to a value of from one to the number of 'd'. Accordingly, as the head marker, computing device 110 may set one of the two-bit binary number into multiple number of 'k' slots to which the result values of the 'k' number of hash functions of the $j_0$-th set correspond. Processing may proceed from block 520 to block 530.

At block 530 (Obtain Result of J-th Set of Hash Function), computing device 110 may obtain a result of a j-th set of hash functions with regard to the keyword. The number of 'j' may be an integer which is the same as or larger than one and may be increased by one whenever the keyword is registered in database 120. Each j-th set of hash functions may include 'k' number of hash functions. Processing may proceed from block 530 to block 540.

At block 540 (Mark Tail Marker Based On Result of J-th Set of Hash Function), computing device 110 may mark a tail marker into the bit array of the counting bloom filter based at least in part on the result values of the j-th set of hash functions, which are obtained at block 530. Result values of the 'k' number of hash functions of each j-th set, which are obtained at block 530, may corresponds to a value of from one to the number of 'd'. Accordingly, as the tail marker, computing device 110 may set one of the two-bit binary number into multiple number of 'k' slots to which the result values of the 'k' number of hash functions of each j-th set correspond. Processing may proceed from block 540 to block 550.

At block 550 (Determine that All Binary Numbers Stored in Slots are Larger than Zero), computing device 110 may determine that all of the f-bit binary numbers stored in the 'k' number of slots are larger than zero. By way of example, but not limitation, computing device 110 may calculate and process from first set of hash functions to j-th set of hash functions with regard to the keyword. Then, computing device 110 may determine the number of 'j', when all of the f-bit binary numbers stored in the 'k' slots, to which the result values of the 'k' hash functions of the j-th set of hash functions correspond, are larger than zero. Processing may proceed from block 550 to block 560.

At block 560 (Determine Counting Number of Keyword), computing device 110 may determine a counting number of the keyword as the number of 'j' which is determined at block 550.

FIG. 6 shows another example flow diagram of a process 600 of a computing device for computing a counting number of a keyword, arranged in accordance with at least some embodiments described herein. The method in FIG. 6 may be implemented by computing device 110 illustrated in FIG. 1. An example process may include one or more operations, actions, or functions as illustrated by one or more blocks 610, 620, 630, 640, 650, 660, 670, 680 and/or 690. Although illustrated as discrete blocks, various blocks may be divided into additional blocks, combined into fewer blocks, or eliminated, depending on the desired implementation. Processing may begin at block 610.

At block 610 (Obtain Result of $J_0$-th Set of Hash Function of $I^0$-th Digit), computing device 110 may obtain a result of a j-th set of hash functions of an $i^s$-th digit with regard to a keyword, when the number of 'j' and 's' are zero. The $j_0$-th set of hash functions of the $i^0$-th digit may include 'k' number of hash functions. By way of example, computing device 110 may process the 'k' number of hash functions of the $j_0$-th set with regard to the keyword and obtain result values of the each 'k' number of hash functions. Processing may proceed from block 610 to block 620.

At block 620 (Mark Head Marker Into Bit Array of $I^0$-th Digit Based On Result of $J_0$-th Set of Hash Function of $I^0$-th Digit), computing device 110 may mark a head marker into a bit array of an $i^s$-th digit of a counting bloom filter based at least in part on the result values of the $j_0$-th set of hash functions of the $i^0$-th digit. The bit array of the $i^0$-th digit of the counting bloom filter may include 'd' number of slots. An f-bit binary number may be recorded in each of the 'd' number of slots. The result values of the 'k' number of hash functions of the $j_0$-th set of hash functions of the $i^0$-th digit, which are obtained at block 610, may corresponds to a value of from one to the number of 'd'. Accordingly, as the head marker, computing device 110 may set one of the two-bit binary number into multiple number of 'k' slots to which the result values of the 'k' number of hash functions of the $j_0$-th set of the $i^0$-th digit correspond. Processing may proceed from block 620 to block 630.

At block 630 (Obtain Result of J-th Set of Hash Function of $I^s$-th Digit), computing device 110 may obtain a result of the j-th set of hash functions of the $i^s$-th digit with regard to the keyword. The number of 'j' may be an integer which is the same as or larger than one and may be increased by one whenever the keyword is registered in database 120 more by '$i^s$' time. Further, the number of 's' may be an integer which is the same as or larger than zero. Each j-th set of hash functions may include 'k' number of hash functions. Processing may proceed from block 630 to block 640.

At block 640 (Mark Tail Marker Into Bit Array of $I^s$-th Digit Based On Result of J-th Set of Hash Function of $I^s$-th Digit), computing device 110 may mark a tail marker into the bit array of the $i^s$-th digit of the counting bloom filter based at least in part on the result values of the j-th set of hash functions of the $i^s$-th digit which are obtained at block 630. Result values of the 'k' number of hash functions of each j-th set of hash functions of the $i^s$-th digit, which are obtained at block 630, may corresponds to a value of from one to the number of 'd'. Accordingly, as the tail marker, computing device 110 may set one of the two-bit binary number into multiple number of 'k' slots to which the result values of the 'k' number of hash functions of each j-th set correspond.

Processing May Proceed from Block 640 to Block 650.

At block 650 (Obtain Result of J-th Set of Hash Function of $I^{(s+1)}$-th Digit), computing device 110 may obtain a result of an m-th set of hash functions of an $i^{(s+1)}$-th digit with regard to the keyword. The number of 'm' may be an integer which is the same as or larger than zero and may be increased by one whenever the keyword is registered in database 120 more by '$i^{(s+1)}$' time. Each m-th set of hash functions may include 'k' number of hash functions. Processing may proceed from block 650 to block 660.

At block 660 (Mark Tail Marker Into Bit Array of $I^{(s+1)}$-th Digit Based On Result of M-th Set of Hash Function of $I^{(s+1)}$-th Digit), computing device 110 may mark a tail marker into a bit array of the $i^{(s+1)}$-th digit of the counting bloom filter based at least in part on the result values of the m-th set of hash function of the $i^{(s+1)}$-th digit which are obtained at block 650. The bit array of the $i^{(s+1)}$-th digit of the counting bloom filter may include 'e' number of slots. The number of 'e' may be the same or smaller than the number of 'd'. An f-bit binary number may be recorded in each of the 'e' number of slots. Result values of the 'k' number of hash functions of each m-th set of hash function of the $i^{(s+1)}$-th digit, which are obtained at block 650, may corresponds to a value of from one to the number of 'e'. Accordingly, as the tail marker, computing device 110 may set one of the two-bit binary number into multiple number of 'k' slots to which the result values of the 'k' number of hash functions of each m-th set correspond. Processing may proceed from block 660 to block 670.

At block 670 (Determine that All Binary Numbers Stored in Slots of Bit Array of $I^s$-th Digit are Larger than Zero), computing device 110 may determine that all of the f-bit binary numbers stored in the 'k' number of slots of the bit array of the $i^s$-th digit are larger than zero. By way of example, but not limitation, computing device 110 may calculate and process from first set of hash functions to j-th set of hash functions of the $i^s$-th digit with regard to the keyword. Then, computing device 110 may determine the number of 'j', when all of the f-bit binary numbers stored in the 'k' slots, to which the result values of the 'k' hash functions of the j-th set of hash functions of the $i^s$-th digit correspond, are larger than zero. Processing may proceed from block 670 to block 680.

At block 680 (Determine that All Binary Numbers Stored in Slots of Bit Array of $I^{(s+1)}$-th Digit are Larger than Zero), computing device 110 may determine that all of the f-bit binary numbers stored in the 'k' number of slots of the bit array of the $i^{(s+1)}$-th digit are larger than zero. By way of example, but not limitation, computing device 110 may calculate and process from first set of hash functions to m-th set of hash functions of the $i^{(s+1)}$-th digit with regard to the keyword. Then, computing device 110 may determine the number of 'm', when all of the f-bit binary numbers stored in the 'k' slots, to which the result values of the 'k' hash functions of the m-th set of hash functions of the $i^{(s+1)}$-th digit correspond, are larger than zero. Processing may proceed from block 680 to block 690.

At block 690 (Obtain Total Counting Number of Keyword Based On 'J' and 'M'), computing device 110 may obtain a total counting number that the keyword is registered in a database based at least in part on the numbers of 'j' and 'm' determined at blocks 670 and 680. By way of example, but not limitation, computing device 110 may be configured to multiply the number of 'j' by the number of '$i^s$' and multiply the number of 'm' by the number of '$i^{(s+1)}$'. Then, computing device 110 may be further configured to sum the result of multiplication of 'j' and '$i^s$' and the result of multiplication of 'm' and '$i^{(s+1)}$'. So, computing device 110 may be configured to determine the total counting number of as the result of the sum.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIG. 7 illustrates a computer program product that may be utilized to provide a scheme for computing a counting number of a keyword, arranged in accordance with at least some embodiments described herein. Computer program product 700 may include a signal bearing medium 710. Signal bearing medium 710 may include one or more instructions 720 that, when executed by, for example, a processor, may provide the functionality described above with respect to FIGS. 1-6. In some examples, instructions 720 may include: one or more instructions for obtaining a result of a j-th set of hash functions with regard to a keyword; one or more instructions for marking a head marker into a bit array of a bloom filter based at least in part on the result of the j-th set of hash functions, if the j is zero; one or more instructions for marking a tail marker into the bit array of the bloom filter based at least in part on the result of the j-th set of hash functions, if the j is the same as or larger than 1. Thus, for example, referring to FIG. 5, computing device 110 may undertake one or more of the blocks shown in FIG. 5 in response to instructions 720.

In some other examples, instructions 720 may include: one or more instructions for obtaining a result of a j-th set of hash functions of an $i^s$-th digit with regard to a key; one or more instructions for marking a head marker into a bit array of the $i^s$-th digit of a bloom filter based at least in part on the result of the j-th set of hash functions of the $i^s$-th digit, if the j is zero; one or more instructions for marking a tail marker into the bit array of the $i^s$-th digit of the bloom filter based at least in part on the result of the j-th set of hash functions of the $i^s$-th digit, if the j is the same as or larger than 1; one or more instructions for obtaining a result of an m-th set of hash functions of an $i^{(s+1)}$-th digit with regard to the key; one or more instructions for marking a tail marker into a bit array of the $i^{(s+1)}$-th digit of the bloom filter based at least in part on the result of the m-th set of hash functions of the $i^{(s+1)}$-th digit. Thus, for example, referring to FIG. 6, computing device 110 may undertake one or more of the blocks shown in FIG. 6 in response to instructions 720.

In some implementations, signal bearing medium 710 may encompass a computer-readable medium 730, such as, but not limited to, a hard disk drive (HDD), a Compact Disk (CD), a Digital Versatile Disk (DVD), a digital tape, memory, etc. In some implementations, signal bearing medium 710 may encompass a recordable medium 740, such as, but not limited to, memory, read/write (R/W) CDs, R/W DVDs, etc. In some implementations, signal bearing medium 710 may encompass a communications medium 750, such as, but not limited to, a digital and/or an analog communication medium (e.g., a fiber optic cable, a waveguide, a wired communication link, a wireless communication link, etc.). Thus, for example, computer program product 700 may be conveyed to one or more modules of computing device 110 by an RF signal bearing medium 710, where the signal bearing medium 710 is conveyed by a wireless communications medium 750 (e.g., a wireless communication medium conforming with the IEEE 802.11 standard).

FIG. 8 is a block diagram illustrating an example computing device that may be utilized to provide a scheme for computing a counting number of a keyword, arranged in accordance with at least some embodiments described herein. In these examples, elements of computing device 800 may be arranged or configured for a device. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (μP), a microcontroller (μC), a digital signal processor (DSP), or any combination thereof. Processor 804 may include one or more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations, memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, an application 822, and program data 824. Application 822 may include instructions 826 that may be arranged to perform the functions as described herein including the actions described with respect to computing device architecture as shown in FIG. 1 or including the actions described with respect to the flow charts shown in FIGS. 5 and 6. In some examples, application 822 may be arranged to operate with program data 824 on an operating system 820 such that the schemes for computing a counting number of a keyword as described herein may be provided.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method performed under control of a computing device, the method comprising:
   obtaining a result of a j-th set of hash functions with regards to a keyword, wherein the j is an integer, and wherein the j-th set of hash functions includes k number of hash functions;
   marking a head marker into a bit array of a bloom filter based at least in part on the result of the j-th set of hash functions, if the j is zero, to indicate that the keyword is registered,
      wherein the bit array includes d number of slots, an f-bit binary number is recorded in each of the d slots, and the result of the each hash function corresponds to one slot from 1 to the d, and
      wherein the marking the head marker includes setting 1 of the f-bit binary number into k number of slots among the d slots of the bit array, and the result of the each hash function which is included in the j-th set of hash functions corresponds to each of the k slots of the bit array; and
   marking a tail marker into the bit array of the bloom filter based at least in part on the result of the j-th set of hash functions, if the j is same as or larger than 1, to indicate how many times the keyword is registered,
      wherein the marking the tail marker includes increasing the f-bit binary number by one, which is stored in other k number of slots among the d slots of the bit array, and the result of each hash function which is included in the j-th set of hash functions corresponds to each of the other k slots of the bit array.

2. The method of claim 1, wherein the other k slots include at least one of the k slots.

3. The method of claim 1, further comprising:
   determining that the f-bit binary number stored in the other k slots of the bit array are larger than zero; and
   determining that a counting number of the keyword is the j which is same as or larger than 1.

4. The method of claim 1, further comprising:
   obtaining a result of a (j+1)-th set of hash functions of the keyword;
   decreasing the f-bit binary number by one, which is stored in the other k slots among the d slots of the bit array; and
   re-marking the tail marker into the bit array of the bloom filter based at least in part on the result of the (j+1)-th set of hash functions, if the j is same as or larger than 1.

5. The method of claim 4, wherein the re-marking the tail marker includes increasing the f-bit binary number by one, which is stored in the other k number of slots among the d slots of the bit array, wherein the result of the each hash function which is included in the (j+1)-th set of hash functions corresponds to each of the other k slots of the bit array.

6. A method performed under control of a computing device, the method comprising:
obtaining a result of a particular set of hash functions of an $i^s$-th digit with regards to a keyword, wherein i is an integer greater than one, wherein s is an integer greater than or equal to zero, and wherein the particular set of hash functions includes a particular number of hash functions;
marking a head marker into a bit array of the $i^s$-th digit of a bloom filter based at least in part on the result of the particular set of hash functions, so as to indicate that the keyword is registered, in response to a determination that the particular set is a first set among a first plurality of sets of hash functions,
  wherein the bit array includes a first number of slots, and a result of each hash function included in the particular set of hash functions corresponds to one slot among the first number of slots, and
  wherein the marking the head marker includes setting 1 as a binary number into a particular number of slots, among the first number of slots, that is equal to the particular number of hash functions, and the result of the each hash function corresponds to each of the particular number of slots; and
marking a tail marker into the bit array of the $i^s$-th digit of the bloom filter based at least in part on the result of the particular set of hash functions, so as to indicate a number of times the keyword is registered, in response to a determination that the particular set is same as or greater than a second set among the first plurality of sets of hash functions,
  wherein the marking the tail marker includes increasing the binary number by one, which is stored in other number of slots among the first number of slots, and the result of the each hash function corresponds to each of the other number of slots among the first number of slots, and
  wherein the first plurality of sets of hash functions is within a range from the first set to an i-th set.

7. The method of claim 6, further comprising:
obtaining a result of another set of hash functions of an $i^{(s+1)}$-th digit with regards to the keyword; and
marking a tail marker into a bit array of the $i^{(s+1)}$-th digit of the bloom filter based at least in part on the result of the other set of hash functions of the $i^{(s+1)}$-th digit, wherein the other set of hash functions is a set among a second plurality of sets of hash functions,
wherein the second plurality of sets of hash functions is within a range from a first set to an i-th set.

8. The method of claim 7, wherein:
the obtaining the result of the other hash functions of the $i^{(s+1)}$-th digit includes obtaining a result of a particular number of hash functions included in the other set of hash functions, the particular number of hash functions in the other set of hash functions is equal to the particular number of hash functions in the particular set of hash functions,
  the marking the tail marker into the bit array of the $i^{(s+1)}$-th digit includes marking the tail marker into at least one slot of a second number of slots,
the method further comprises
  recording a binary number in each of the second number of slots, wherein the binary number is within a range from zero to (i-1),
  the first number of slots is same as or greater than the second number of slots, and
the particular number of hash functions in the other set of hash functions is smaller than the first number of slots and the second number of slots.

9. The method of claim 8,
wherein the obtaining the result of the other set of hash functions includes obtaining a result of the each hash function included in the other set of hash functions that corresponds to one slot among the second number of slots.

10. The method of claim 9, wherein:
the marking the tail marker into the bit array of the $i^{(s+1)}$-th digit includes increasing the binary number by one, which is stored in the other number of slots, among the second number of slots, that is equal to the particular number of hash functions of the bit array of the $i^{(s+1)}$-th digit, and
the result of the each hash function which is included in the other set of hash functions of the $i^{(s+1)}$-th digit corresponds to each of the other number of slots among the second number of slots.

11. The method of claim 10, further comprising:
determining that the binary numbers stored in the other number of slots among the first number of slots of the bit array of the $i^s$-th digit is greater than zero;
determining that a counting number of the $i^s$-th digit is a total number of sets in the first plurality of sets of hash functions;
determining that the binary numbers stored in the other number of slots among the second number of slots of the bit array of the $i^{(s+1)}$-th digit is greater than zero;
determining that a counting number of the $i^{(s+1)}$-th digit is a total number of sets in the second plurality of sets of hash functions; and
obtaining a counting number of the keyword based at least in part on the total number of sets in the first plurality of sets of hash functions and the total number of sets in the second plurality of sets of hash functions.

12. The method of claim 10, further comprising:
obtaining a result of a next set of hash functions of the $i^s$-th digit with regards to the keyword;
wherein the next set of hash functions of the $i^s$-th digit is positioned next to the particular set of hash functions;
decreasing the binary number by one, which is stored in the other number of slots among the first number of slots of the bit array of the $i^s$-th digit;
re-marking the tail marker into the bit array of the $i^s$-th digit of the bloom filter based at least in part on the result of the next set of hash functions of the $i^s$-th digit, in response to a determination that the particular set of hash functions is same as or greater than the second set among the first plurality of sets of hash functions;
obtaining a result of a next set of hash functions of the $i^{(s+1)}$-th digit with regards to the keyword;
wherein the next set of hash functions of the $i^{(s+1)}$-th digit is positioned next to the other set of hash functions;
decreasing the binary number by one, which is stored in the particular number of slots among the second number of slots of the bit array of the $i^{(s+1)}$i-th digit; and
re-marking the tail marker into the bit array of the $i^{(s+1)}$-th digit of the bloom filter based at least in part on the result of the next set of hash functions of the $i^{(s+1)}$-th digit, in response to a determination that the other set is same as or greater than a first set among the second plurality of sets of hash functions.

13. A non-transitory computer-readable storage medium having stored thereon computer-executable instructions that, in response to execution, cause a computing device to perform or control performance of operations to:
   obtain a result of a j-th set of hash functions with regard to a keyword, wherein the j is an integer, and wherein the j-th set of hash functions includes k number of hash functions;
   mark a head marker into a bit array of a bloom filter based at least in part on the result of the j-th set of hash functions, if the j is zero, to indicate that the keyword is registered,
      wherein the bit array includes d number of slots, an f-bit binary number is recorded in each of the d slots, and the result of each hash function corresponds to one of from 1 to the d, and
      wherein the marking the head marker includes setting 1 of an f-bit binary number into k number of slots among the d slots of the bit array, and the result of each hash function which is included in the j-th set of hash functions corresponds to each of the k slots of the bit array; and
   mark a tail marker into the bit array of the bloom filter based at least in part on the result of the j-th set of hash functions, if the j is same as or larger than 1, to indicate how many times the keyword is registered,
      wherein the marking the tail marker includes increasing the f-bit binary number by one, which is stored in other k number of slots among the d slots of the bit array, and the result of the each hash function which is included in the j-th set of hash functions corresponds to each of the other k slots of the bit array.

14. A non-transitory computer-readable storage medium having stored thereon computer-executable instructions that, in response to execution, cause a computing device to perform or control performance of operations to:
   obtain a result of a j-th set of hash functions of an $i^s$-th digit with regards to a keyword, wherein the i is an integer which is larger than one, wherein the j is an integer which is within a range of from zero to (i-1), wherein the s is an integer which is same as or larger than zero, and wherein the j-th set of hash functions includes k number of hash functions;
   mark a head marker into a bit array of the $i^s$-th digit of a bloom filter based at least in part on the result of the j-th set of hash functions, if the j is zero, to indicate that the keyword is registered,
      wherein the bit array of the $i^s$-th digit includes d number of slots, and the result of the each hash function included in the j-th set of hash functions corresponds to one of from 1 to the d, and
      wherein the mark of the head marker includes setting 1 of an f-bit binary number into k number of slots among the d slots of the bit array of the $i^s$-th digit, and the result of the each hash function corresponds to each of the k slots of the bit array of the $i^s$-th digit; and
   mark a tail marker into the bit array of the $i^s$-th digit of the bloom filter based at least in part on the result of the j-th set of hash functions of the $i^s$-th digit, if the j is same as or larger than 1, to indicate a number of times the keyword is registered,
      wherein the marking the tail marker includes increasing the f-bit binary number by one, which is stored in other k number of slots among the d slots of the bit array of the $i^s$-th digit, and the result of the each hash function corresponds to each of the other k slots of the bit array of the $i^s$-th digit.

15. A system, comprising:
   a memory; and
   a computing device operatively coupled to the memory, the computing device comprising:
      a hash function generator configured to obtain a result of a particular set of hash functions with regards to a keyword, wherein the particular set of hash functions includes a particular number of hash functions;
      a marker coupled to the hash function generator and configured to:
         mark a head marker into a bit array of a bloom filter in the memory based at least in part on the result of the particular set of hash functions, so as to indicate that the keyword is registered, in response to a determination that the particular set is a first set among a plurality of sets of hash functions,
            wherein the bit array includes a number of slots, and a result of each hash function included in the particular set of hash functions corresponds to one slot among the number of slots, and
            wherein the marker is further configured to mark the head marker by setting a binary number into a particular number of slots, among the number of slots, that is equal to the particular number of hash functions; and
         mark a tail marker into the bit array of the bloom filter based at least in part on the result of the particular set of hash functions, so as to indicate a number of times the keyword is registered, in response to a determination that the particular set is same as or greater than a second set among the plurality of sets of hash functions,
            wherein the marker is further configured to mark the tail marker by increasing the binary number by one, which is stored in other number of slots among the number of slots, and the result of the each hash function corresponds to each of the other number of slots; and
      a counter, coupled to the marker, configured to determine a counting number of the keyword based on the marking into the bit array by the marker.

16. The system of claim 15, wherein the other number of slots includes at least one slot of the particular number of slots.

17. The system of claim 15, wherein the counter is configured to:
   determine that the binary number stored in the other number of slots is greater than zero; and
   determine that the counting number of the keyword is equal to the particular set of hash functions which is same as or greater than 1.

18. The system of claim 15, wherein the hash function generator is configured to:
   obtain a result of a set of hash functions with regards to the keyword, wherein the set of hash functions is positioned next to the particular set of hash functions;
   decrease the binary number by one, which is stored in the other number of slots among the number of slots of the bit array; and
   re-mark the tail marker into the bit array of the bloom filter based at least in part on the result of the set of hash functions, in response to a determination that the particular set of hash functions is same as or greater than the first set.

* * * * *

UNITED STATES PATENT AND TRADEMARK OFFICE
CERTIFICATE OF CORRECTION

| | | |
|---|---|---|
| PATENT NO. | : 9,740,797 B2 | Page 1 of 2 |
| APPLICATION NO. | : 15/021133 | |
| DATED | : August 22, 2017 | |
| INVENTOR(S) | : Nyang | |

It is certified that error appears in the above-identified patent and that said Letters Patent is hereby corrected as shown below:

In the Specification

In Column 6, Line 4, delete "of based" and insert -- of 'j' based --, therefor.

In Column 7, Line 26, delete "j0-th" and insert -- $j_o$-th --, therefor.

In Column 8, Line 19, delete "of when" and insert -- of 'j', when --, therefor.

In Column 10, Line 33, delete "the number" and insert -- the 'k' number --, therefor.

In Column 12, Line 3, delete "$m_o$-th" and insert -- $m_1$-th --, therefor.

In the Claims

In Column 21, Line 54, in Claim 8, delete "other hash" and insert -- other set of hash --, therefor.

In Column 22, Line 43, in Claim 12, delete "keyword;" and insert -- keyword, --, therefor.

In Column 22, Line 56, in Claim 12, delete "keyword;" and insert -- keyword, --, therefor.

In Column 22, Line 61, in Claim 12, delete "$i^{(s+1)}$i-th" and insert -- $i^{(s+1)}$-th --, therefor.

In Column 23, Lines 19-20, in Claim 13, delete "of each" and insert -- of the each --, therefor.

In Column 24, Line 7, in Claim 15, delete "a hash function generator configured to" and insert -- a computing processor configured to: --, therefor.

In Column 24, Lines 10-12, in Claim 15, delete "functions; a marker coupled to the hash function generator and configured to:" and insert -- functions; --, therefor.

Signed and Sealed this
Fifteenth Day of May, 2018

Andrei Iancu
*Director of the United States Patent and Trademark Office*

CERTIFICATE OF CORRECTION (continued)
U.S. Pat. No. 9,740,797 B2

In Column 24, Lines 21-22, in Claim 15, delete "slots, and wherein the marker is further configured to mark the" and insert -- slots; mark the --, therefor.

In Column 24, Lines 26-27, in Claim 15, delete "functions; and mark" and insert -- functions; mark --, therefor.

In Column 24, Lines 33-34, in Claim 15, delete "functions, wherein the marker is further configured to mark the" and insert -- functions; mark the --, therefor.

In Column 24, Lines 39-40, in Claim 15, delete "and a counter, coupled to the marker, configured to determine" and insert -- and determine --, therefor.

In Column 24, Line 42, in Claim 15, delete "bit array by the marker." and insert -- bit array. --, therefor.

In Column 24, Line 46, in Claim 17, delete "the counter is" and insert -- the computing processor is --, therefor.

In Column 24, Lines 53-54, in Claim 18, delete "the hash function generator is" and insert -- the computing processor is --, therefor.